US012688748B2

(12) United States Patent
Kamble et al.

(10) Patent No.: US 12,688,748 B2
(45) Date of Patent: *Jul. 21, 2026

(54) AUTOMATIC PRODUCT DISPENSER

(71) Applicant: Frito-Lay North America, Inc., Plano, TX (US)

(72) Inventors: Rahul Sadashiv Kamble, Haryana (IN); Gurmeet Singh Bhutani, Haryana State (IN); Amandeep Singh Gulati, New Delhi (IN)

(73) Assignee: Frito-Lay North America, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/999,178

(22) Filed: Dec. 23, 2024

(65) Prior Publication Data

US 2025/0124755 A1 Apr. 17, 2025

Related U.S. Application Data

(63) Continuation of application No. 18/577,110, filed as application No. PCT/US2022/036088 on Jul. 5, 2022, now Pat. No. 12,217,565.

(30) Foreign Application Priority Data

Jul. 5, 2021 (IN) ............................ 202141030169

(51) Int. Cl.
*G07F 11/44* (2006.01)

(52) U.S. Cl.
CPC .................................. *G07F 11/44* (2013.01)

(58) Field of Classification Search
CPC ......... G07F 11/44; G07F 13/06; G07F 17/078
See application file for complete search history.

(56) References Cited

U.S. PATENT DOCUMENTS

| | | | | |
|---|---|---|---|---|
| 5,309,825 | A | 5/1994 | Pinone | |
| 5,778,767 | A * | 7/1998 | Rudesill .............. | A47J 37/1228 221/265 |
| 2012/0029690 | A1 | 2/2012 | Bruck et al. | |
| 2012/0104034 | A1* | 5/2012 | Koenigsknecht ....... | G07F 11/44 221/277 |
| 2019/0311568 | A1* | 10/2019 | Allegra .................. | G07F 11/50 |

FOREIGN PATENT DOCUMENTS

| | | |
|---|---|---|
| EP | 1256914 | 11/2002 |
| WO | WO 2004010799 | 2/2004 |

OTHER PUBLICATIONS

International Search Report issued on Oct. 21, 2022 in application No. PCT/US2022/036088.
Written Opinion issued on Oct. 21, 2022 in application No. PCT/US2022/036088.
International Preliminary Report on Patentability issued on Nov. 4, 2023 in application No. PCT/US2022/036088.

* cited by examiner

*Primary Examiner* — Jason K Niesz
(74) *Attorney, Agent, or Firm* — Barnes & Thornburg LLP; G. Peter Nichols

(57) ABSTRACT

An automatic touchless dispenser capable of providing one or more crispy and fresh food products to customers independent of the type of food product or container.

20 Claims, 10 Drawing Sheets

AUTOMATIC PRODUCT DISPENSER

This application is a continuation application of and claims priority to U.S. patent application Ser. No. 18/577,110 filed Jan. 5, 2024, the entire contents of which is incorporated herein by reference.

The present disclosure relates generally to devices for dispensing products and, in one instance for dispensing snack food products. More specifically, the present disclosure relates to a touchless dispenser of food products that is designed to maintain the freshness and crispiness as the food products are dispensed.

BACKGROUND

There are no widely available individualized dispensers of bulk food products that dispense more than a single snack or food product. Generally, customers purchase food products such as snacks in pre-packaged individualized serving amounts. For example, customers may typically buy a bag of chips from a vending machine or store. The reasons for this are several. First, snacks, like chips, tend to become soggy and stale when exposed to atmospheric conditions over a period-of-time, such as over 24 hours or less. Second, it is challenging to segregate and keep the snacks from contact with customers and pests when dispensing in bulk. Finally, given all the issues previously described, it is difficult to design a system that is independent of container used to catch or receive the dispensed snack.

A need exists for an automatic dispenser of more than a single food product. Further, a need exists for such an automatic dispenser that is capable of keeping the food product fresh and crisp for least 24 hours.

SUMMARY

Aspects and embodiments of the present invention are set out in the appended claims. These and other aspects and embodiments of the invention are also described herein.

As an initial matter, it is contemplated that the disclosed device is useful for dispensing any of a plethora of products. However, for convenience and ease of description, readability, and understanding, the disclosed device will be described generally in connection with food products and more specifically in connection with snack food products. Thus, unless it is evident that the following description is applicable to food or snack food products, it is contemplated that the following description will apply equally to other products (i.e., non-food products). On the other hand, the following description will provide a description that the skilled artisan will appreciate applies only to food and/or snack food products. In those instances, the described device is intended to apply only to food and/or snack food products.

With that in mind, the disclosed device provides a dispenser of one or more food products such as snacks. Specifically, the dispenser is touchless and includes a food zone defined by one or more compartments configured to separately (not in contact) store food products from each other, from a non-food zone and from the outside environment. Advantageously, the dispenser provides automatic, touchless delivery of one or more fresh and/or crispy food products. Another advantage is that the dispenser is capable of delivering more than one snack independent of the type of container and food products.

To operate as a touchless device, the dispenser may include a number of sensors in communication with a controller that instructs the dispenser's mechanics. The dispenser may include a first sensor that detects the presence of a container. The controller then instructs the dispenser to begin dispensing food products. Further, the dispenser may include a second sensor that detects when the container is sufficiently filled with food products and upon such a detection, the controller instructs the dispenser to stop dispensing the food products. In this manner, the dispenser is capable of operating without customer input or with limited customer input. The dispenser may include a quantity sensor configured to detect a level of food product within the one or more compartments. When the quantity sensor detects a level of food product that is below a preselected level, a signal is communicated to make or add more food product to the one or more compartments. In some embodiments, the dispenser includes a customer sensor that detects the presence of a customer and upon sensing the presence of a customer, the controller instructs the dispenser to begin making more food product.

It is envisioned that as a customer approaches the dispenser, places a container in proximity to the dispenser such as in proximity to a tray associated with the dispenser, the dispenser detects the presence of the container, and the dispenser mechanics begin the process of dispensing one or more food products to the container without further input from the customer. The amount of food product to be dispensed is based on the available volume within the container. The dispenser stops dispensing when it detects that the food product within the container is at a pre-specified level. The customer then removes the container sufficiently filled with a crisp, consumable food product.

To maintain freshness or crispiness of the food product(s), the dispenser may include a temperature sensor in the one or more compartments to independently modulate the temperature in the one or more compartments. In this way, the food products in each of the one or more compartments can be maintained in a fresh and/or crisp condition for at least 12 hours or at least 24 hours. The dispenser may also include one or more mechanisms to control the moisture content in the one or more compartments.

In alternative embodiments, the dispenser includes a user interface for customer interaction and control. As an example, the user interface may provide a method for the customer to input the ratio of two or more food products desired to be dispensed to the container.

The invention extends to methods, systems, kits of parts and apparatus substantially as described herein and/or as illustrated with reference to the accompanying figures.

The invention extends to any novel aspects or features described and/or illustrated herein. In addition, apparatus aspects may be applied to method aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

The following description accompanies the drawings, all given by way of non-limiting examples that may be useful to understand the disclosed devices. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following describes an automatic dispenser 10 capable of dispensing one or more food products into a container 30 so that the container 30 is filled to a pre-specified level. The pre-specified level may also be referred to as a sufficient level. The food products may include any comestible suitable for human consumption. Suitable food products include, but are not limited to, snack products such as crackers, cookies, chips, dried fruits, dried vegetables, fried items, or baked items. In some embodiments, the snack is a chip, a pretzel, or a cheese puff. The term "snack" includes any type of wheat flour, pulse flour, tuber- or cornmeal-based product capable of being dispensed from a bulk supply and refers to both the singular and plural form of the word.

Figure 1:
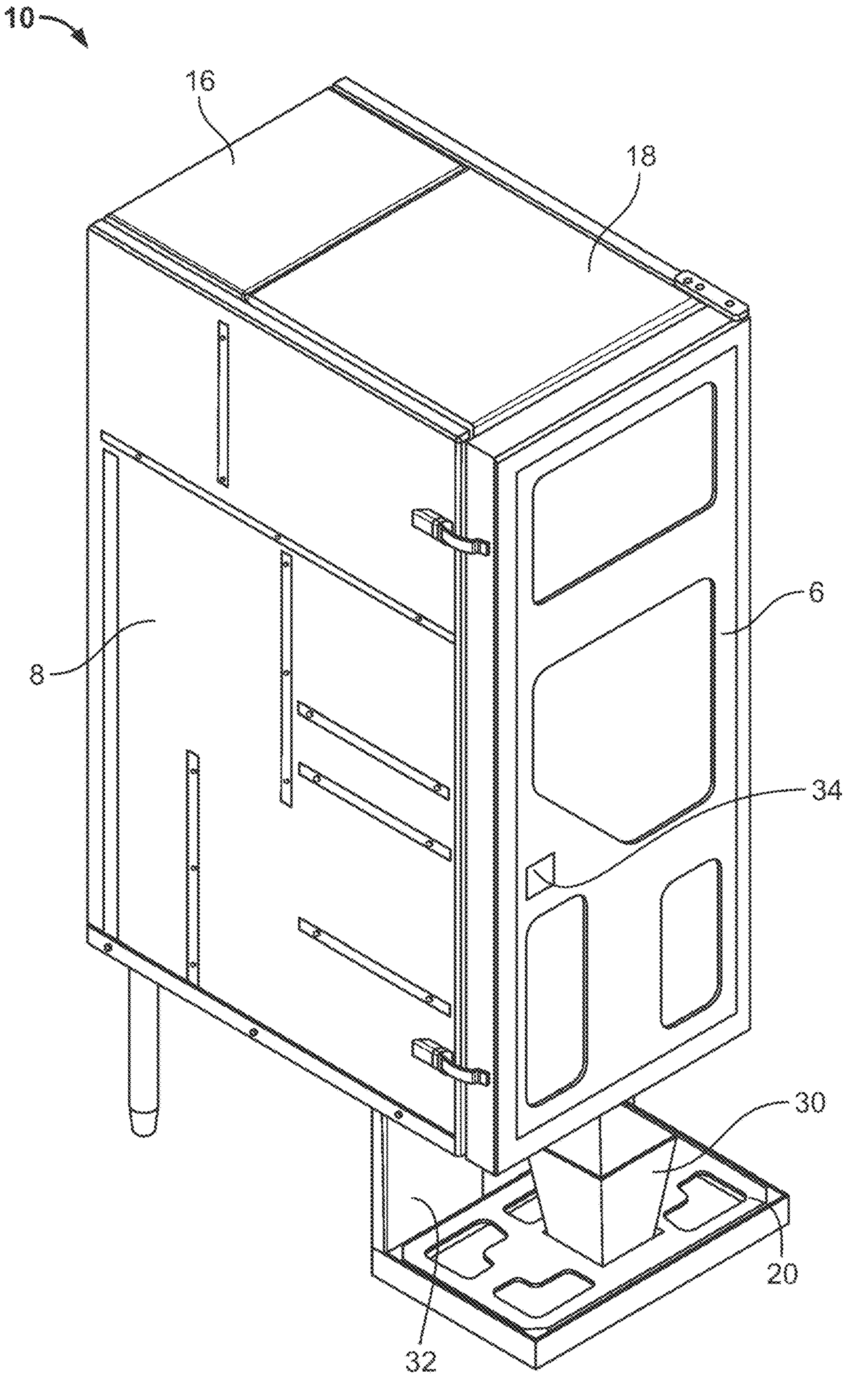
FIG. 1 is a front perspective view of one embodiment of the dispenser.
Figure 2:
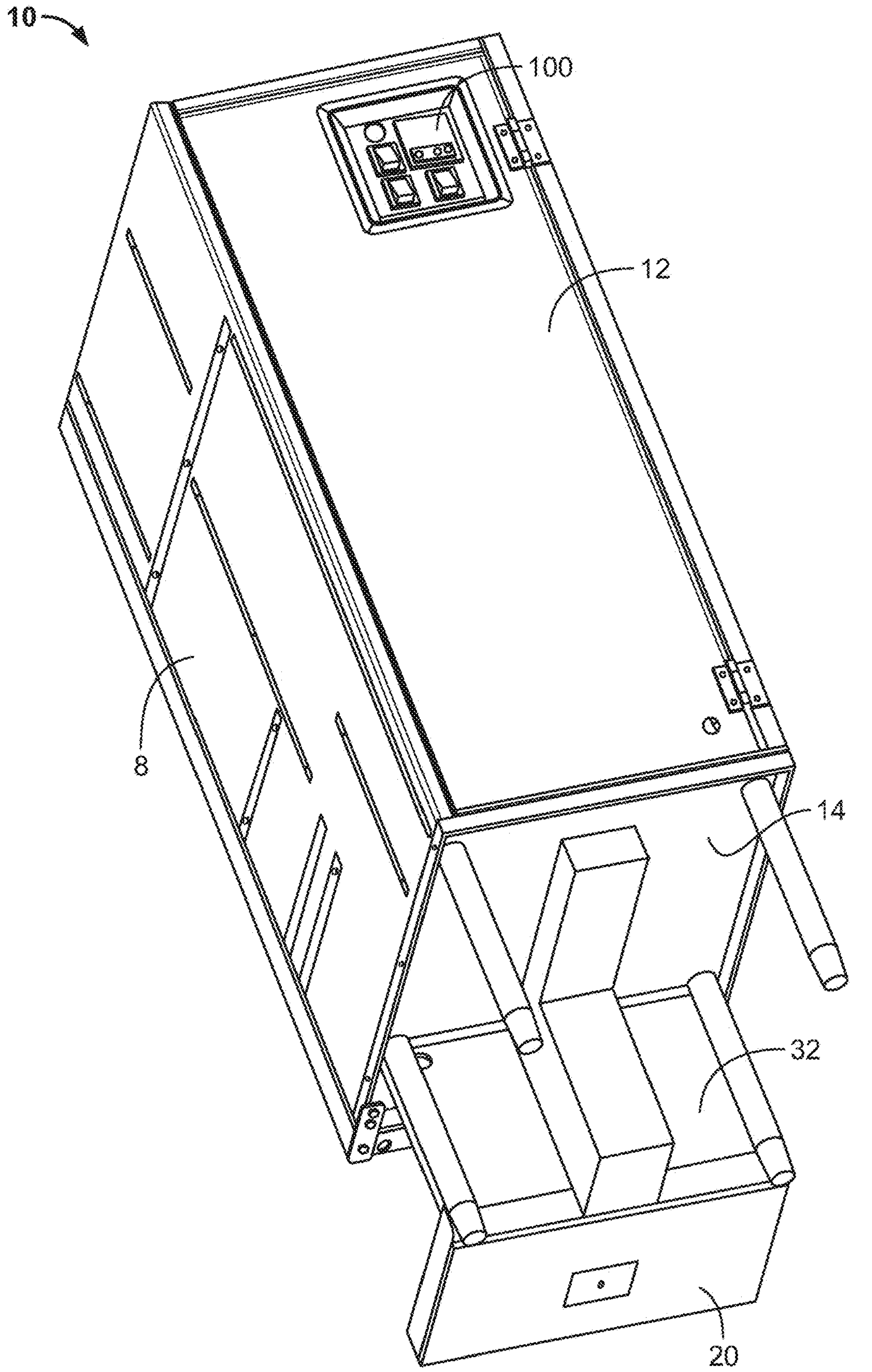
FIG. 2 is a rear perspective view of the dispenser for FIG. 1.

As shown in FIGS. 1 and 2, the dispenser 10 contains a door assembly 6, side panels 8, a back panel 12, a base panel 14, and a top panel 16, one or more of which can be opened to allow access to the interior of the dispenser. The top panel 16 may have a top lid 18 capable of opening to allow access inside the dispenser 10 from the top. The dispenser 10 may be formed of any suitable material including a metal such as aluminum, a polymer such as plastic or polycarbonate, or combinations of such.

The door assembly 6 may include one or more windows to display the one or more food products. During dispensing, the door assembly 6 remains closed. The door assembly 6 may be hinged to the side panel 8 to allow the door assembly 6 to swing open in a horizontal direction or may be hinged to the top panel 16 or base panel 14 to allow the door assembly 6 to swing open vertically. The door assembly 6 may be opened to add one or more food products to the dispenser 10.

As shown in FIG. 1, the door assembly 6 may have a user interface 34 that can be used by the consumer or customer (also may be referred to as the user) to control certain functions and operations of the dispenser. The interface 34 may have tactile or non-tactile buttons or may be provided as a touch screen. For example, the interface may provide control of the type and ratio of dispensed food product(s). For instance, when the dispenser is configured to deliver two products, the ratio of a first food product to a second food product may be about 10:1, 9:1, 8:1, 7:1, 6:1, 5:1, 4:1, 3:2, 3:1, 2:1, 1:1, 1:2, 2:3, 1:3, 1:4, 1:5, 1:6, 1:7, 1:8, 1:9, 1:10, or any numerical value in between. It is also contemplated that, when the dispenser 10 is configured to contain two or more products, the interface may control the dispensing of only a single product, a mixture of two products (as explained above), or a mixture of more than two products in any suitable ratio.

Figure 3:
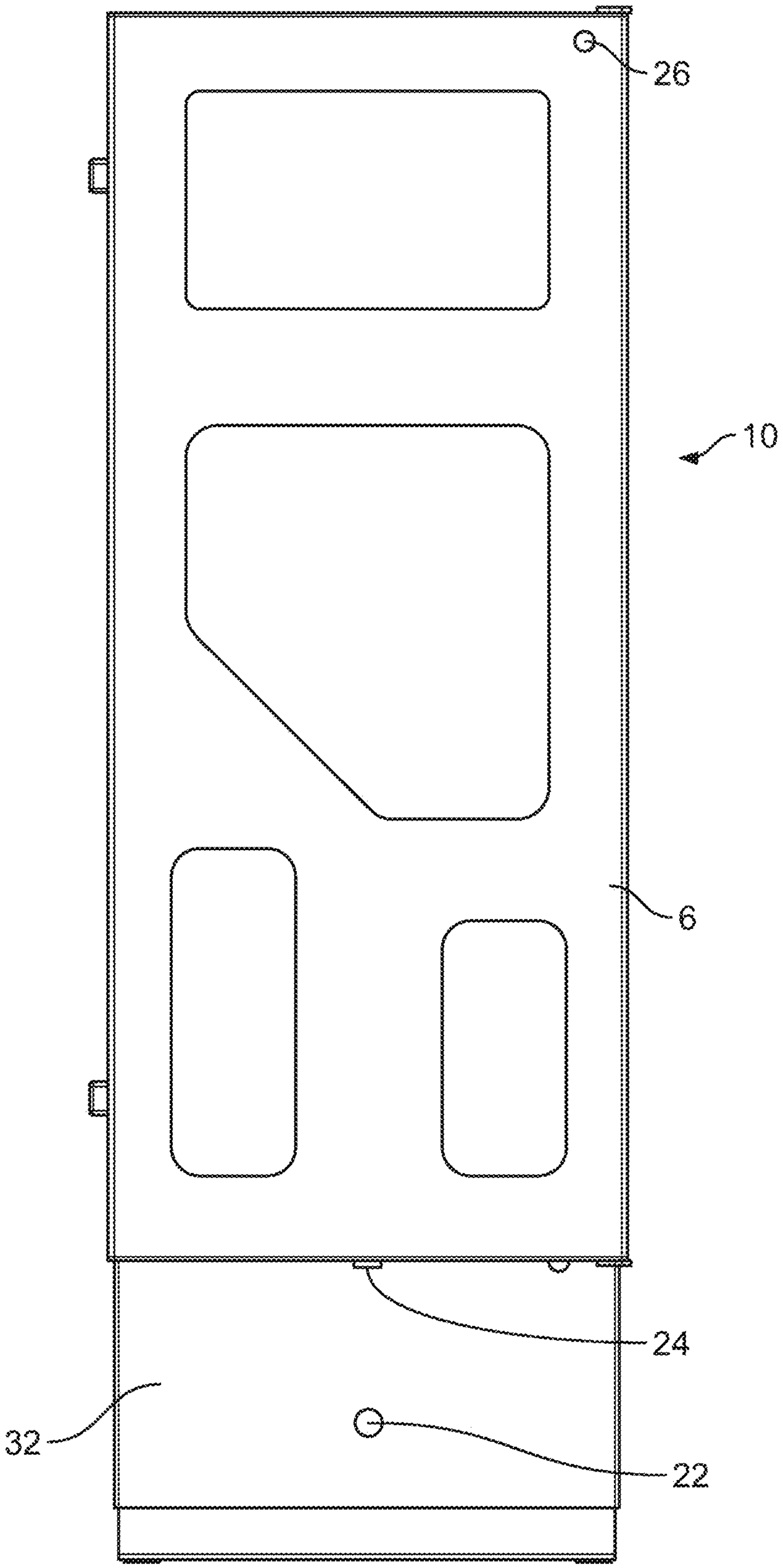
FIG. 3 is a front view of the dispenser or FIG. 1.

Referring now to FIGS. 1 to 3, a tray 20 may be provided in a manner associated with the dispenser and configured to receive a container 30, which will be provided by the customer and will be used to receive the one or more food products dispensed from the dispenser 10. The tray 20 may include depressed regions and/or raised ridges to receive and stabilize the container 30. In some embodiments, the tray 20 may have a top plate with openings, and a hollow receptacle below the top plate to catch dispensed food product that falls outside of or off of the container 30. The tray 20 may be removable or may be foldable to one position where the tray 20 is substantially perpendicular with the base panel 14 and to a second position where the tray 20 is parallel with the base panel 14. The tray 20 may be made of any suitable material including a metal such as aluminum or a polymer such as plastic, or combinations of such.

The dispenser 10 may have a guard 32 located, at least in part, between the door assembly 6 and tray 20. As illustrated in FIG. 3, the guard 32 may be located below the door assembly 6 and may be configured to prevent food product from traveling under the dispenser 10. In one aspect, the guard 32 may have a width up to the width of the dispenser 10. The guard 32 may be formed of any suitable material such as a metal, a polymer, or combinations of such.

Sensors

The dispenser 10 may contain a number of sensors communicatively coupled to a controller 100. The sensors are configured to detect certain events, such as the presence of the container 30, the pre-specified level of dispensed food product, the amount of available food product present in each compartment relative to a preselected threshold level, or the presence of a potential customer. When an event is detected, each respective sensor may communicate that information to the controller 100. The controller 100 instructs dispensing of food product in the presence of the container 30 and instructs to stop dispensing when the container 30 is filled to the pre-specified level.

Figure 6:
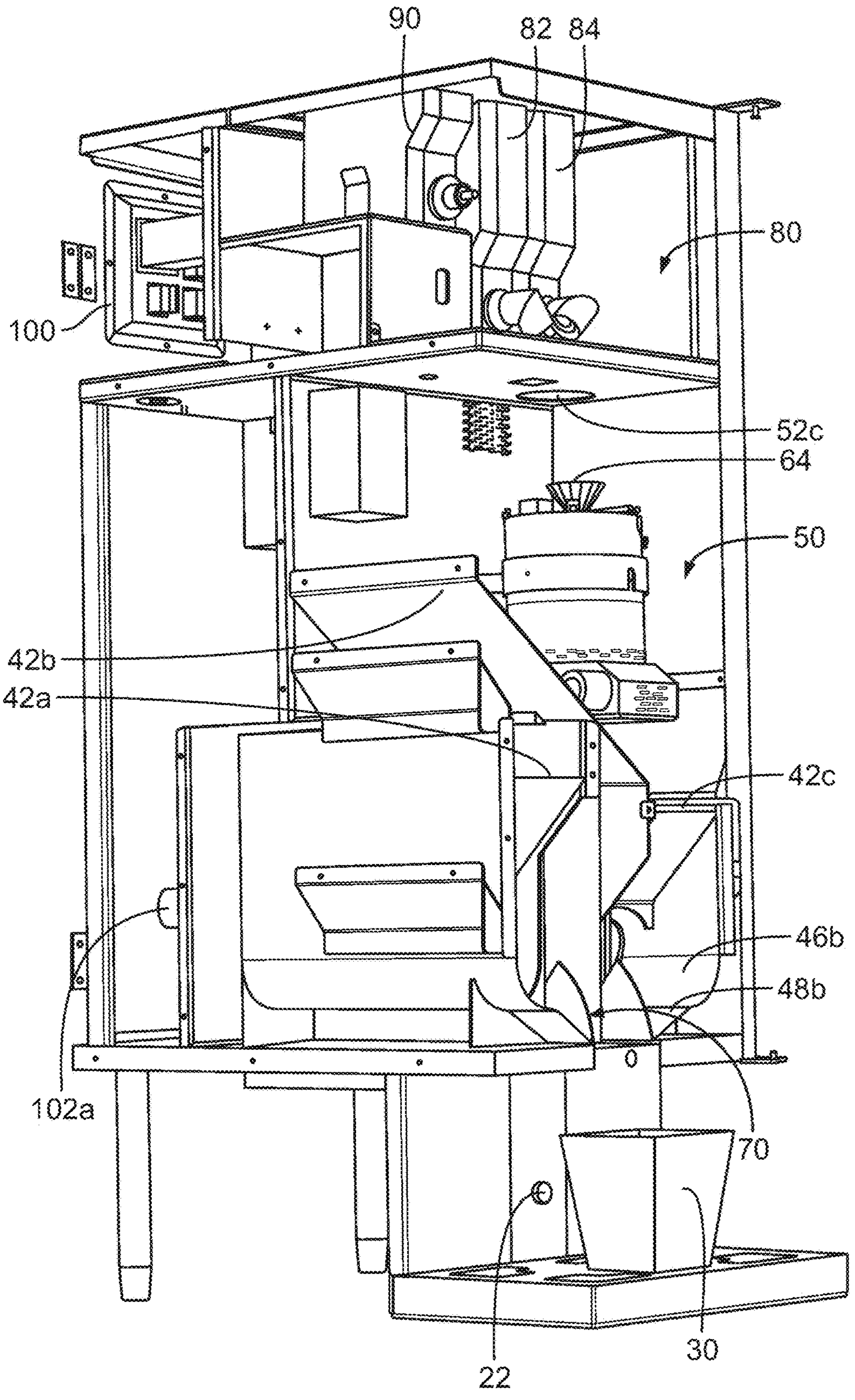
FIG. 6 is a perspective view of the dispenser of FIG. 1 with the housing being removed to show some of the internal parts.

The dispenser 10 may include at least one container sensor 22, such as a proximity sensor, to detect the presence of a container 30. As shown in FIG. 6, the container sensor 22 may be coupled to the guard 32. Alternatively or additionally, the door assembly 6 and/or the tray 20 may include a container sensor 22 (not shown). The container sensor 22 is configured to detect a container 30 when it is placed in a zone of detection for at least a minimum amount of time. The zone of detection is a preselected distance from the dispenser 10. In some instances, the zone of detection may be up to about 155 mm from the container sensor 22. In some aspects, the minimum amount of time may be at least 0.5 seconds.

The dispenser 10 may also include at least one product sensor 24 to detect a pre-specified level of dispensed food product. Referring to FIG. 3, the door assembly 6 may include a product sensor 24 capable of detecting the amount of product dispensed into the container 30. The product sensor 24 may be any suitable type of sensor that is capable of sensing or detecting an amount of food product present in the container 30. In one instance, the product sensor 24 is a proximity sensor. As seen in FIG. 3, the product sensor 24 may be located at the bottom of the door assembly 6. Alternatively, the product sensor 24 may be located at any suitable location such that it can "see" or detect the amount of food product in the container 30. For example, the product sensor 24 may be positioned directly above the container 30. The product sensor 24 may detect the pre-specified level while the one or more food products are dispensed, or may detect the available volume of the container and calculate an amount to dispense prior to dispensing the one or more food products. The product sensor 24 may be configured to detect a pre-specified level between about 75% to about 100% of a volume of the container 30. In some embodiments, the pre-specified level is at least about 75%, 80%, 85%, 90%, 95%, or at least about 100% of filled volume. The pre-specified level may be about 75%, 80%, 85%, 90%, 95%, or about 100% of filled volume.

Figure 4:
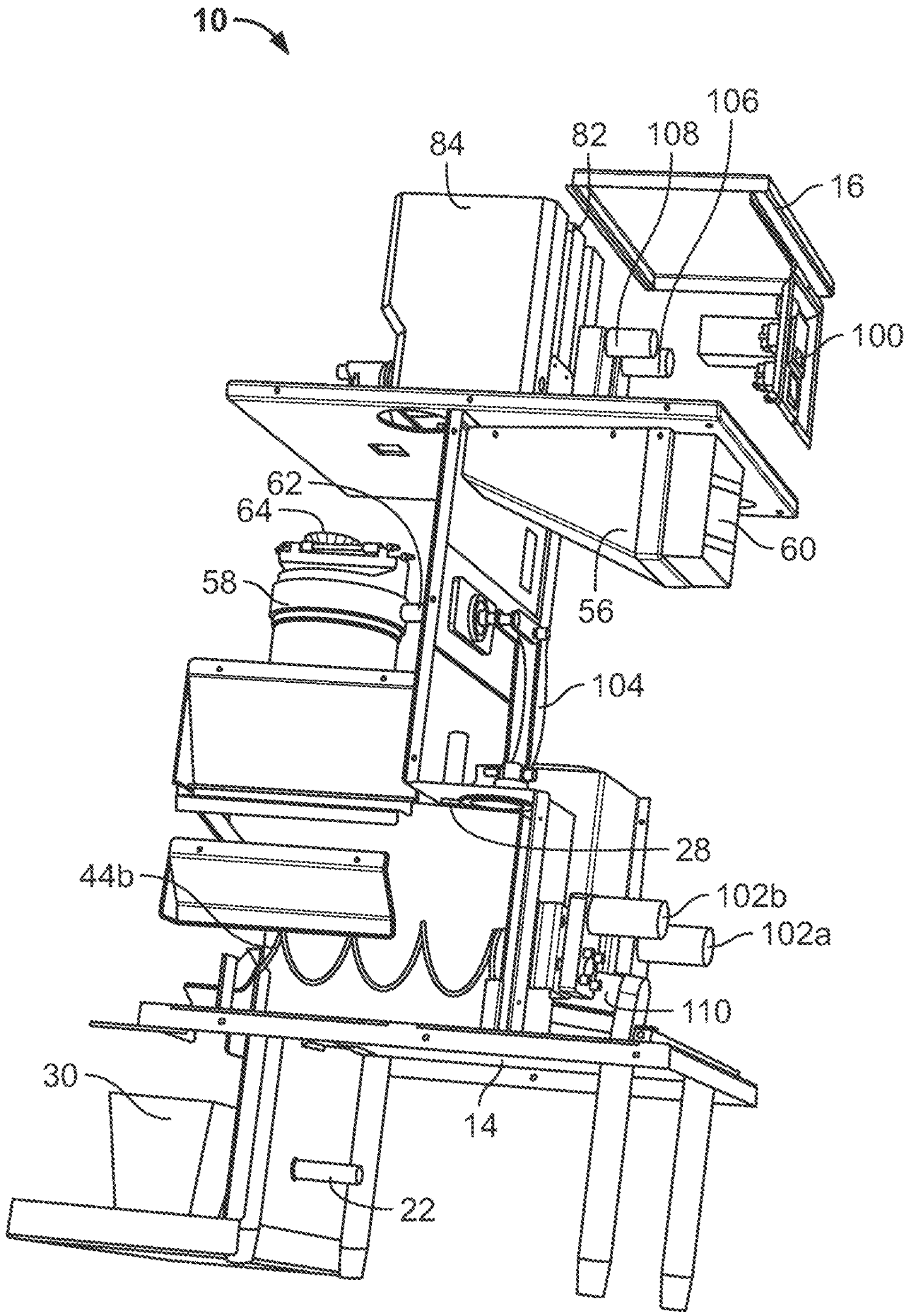
FIG. 4 is a perspective view of the dispenser of FIG. 1 with the housing being removed to show some of the internal parts.

The dispenser 10 may include additional sensors such as a quantity sensor 28 and/or a customer sensor 26, each communicatively coupled to the controller 100, as shown in FIGS. 3 and 4. Where the dispenser is configured to produce fresh food products from raw ingredients, the quantity sensor 28 is configured to detect the amount of available food product already produced and available for dispensing. Once the amount of available food product drops below a preselected threshold level, the quantity sensor 28 sends a signal to the controller 100 to instruct the production of fresh food product. The quantity sensor 28 may be any suitable type of sensor that can detect an amount of available food product. In one instance, the quantity sensor 28 is a proximity sensor.

Where a customer sensor 26 is provided, it may be configured to entice a potential customer to explore the dispenser 10. In one aspect, the customer sensor 26 is configured so that when it senses a potential customer, it sends a signal to the controller 100, which may direct a signal to one or more lights, speakers and the like to produce visual and auditory sensor outputs in an effort to entice the customer. The controller may then instruct the dispenser to begin making fresh food product. In this way, the sounds and smells of the freshly made food product may entice a potential customer to interact with the dispenser 10 and to obtain food product from the dispenser.

When an event is detected, the container sensor 22, the product sensor 24, the quantity sensor 28, or the customer sensor 26 communicates with the controller 100, which then directs the operation of the dispenser 10 as will be discussed in more detail. The controller 100 may be a microcontroller, digital signal processor, or other processor or processing/controlling circuit(s) and in some instances, may be embodied as, include, or otherwise be coupled to a field programmable gate array (FPGA), an application specific integrated circuit (ASIC), reconfigurable hardware or hardware circuitry, or other specialized hardware to facilitate performance of the described functions. As shown in FIG. 2, the controller 100 may be located on the back panel 12, although other suitable locations are contemplated so long as it is located in a non-food zone 2.

Figure 5:
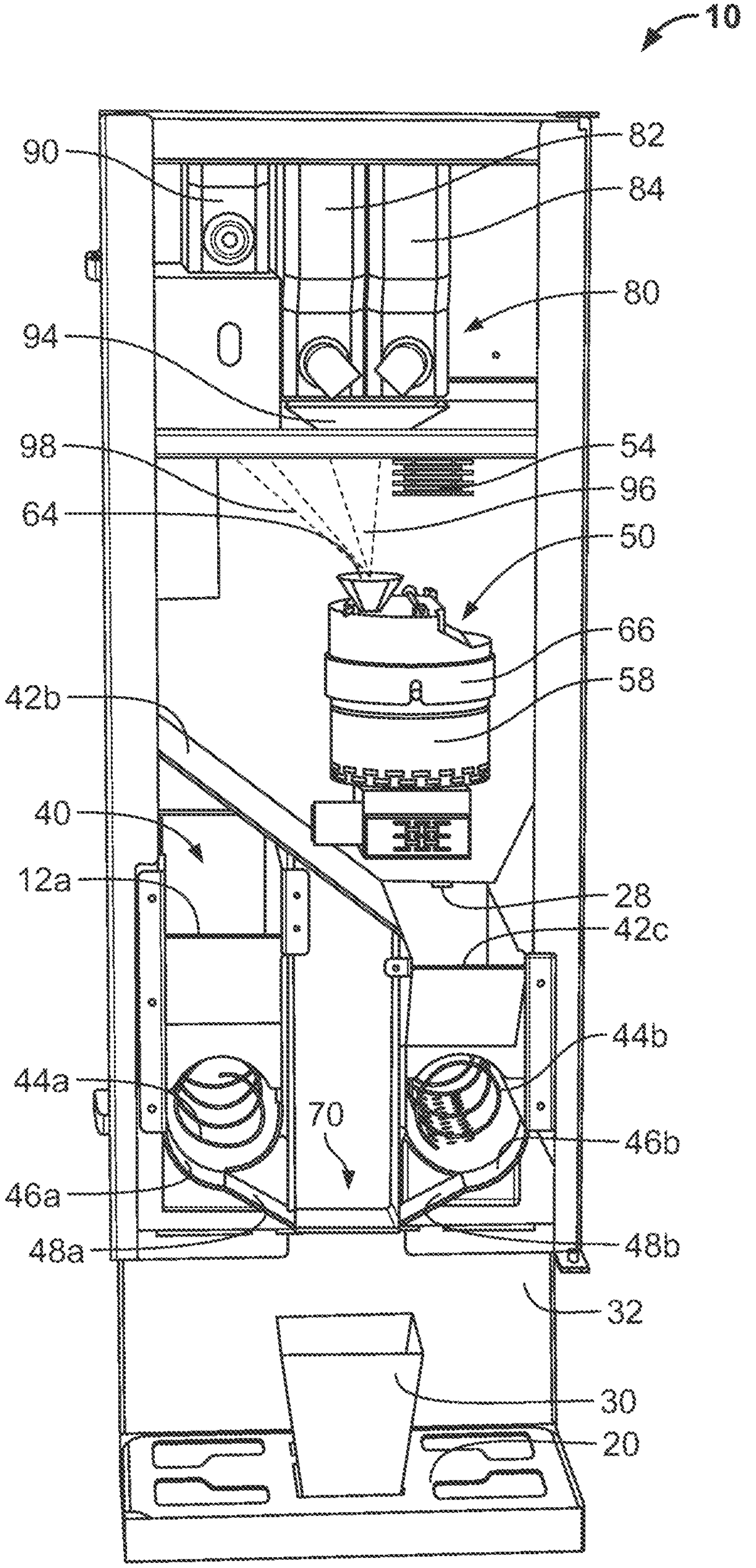
FIG. 5 is a front view of the dispenser of FIG. 1 with the front housing being removed to show some of the internal parts.

Turning to FIGS. 5 and 6, the controller 100 may be configured to instruct the dispenser 10 mechanics based on one or more pieces of information from the sensors. For example, when container sensor 22 detects the presence of the container 30, the controller 100 may or may not instruct the production of more fresh food product depending on the amount of available food product detected by the quantity sensor 28. In another aspect, when the customer sensor 26 detects the presence of a potential customer, the controller 100 may or may not instruct the production of fresh food product depending on the available amount of food product detected by the quantity sensor 28. In another aspect, if the quantity sensor 28 detects an amount of food product below a preselected threshold level, the controller 100 may delay the operation of an outlet 70 until there is enough fresh food product to dispense. In the event the quantity sensor 28 detects a low level of food product before product sensor 24 detects a pre-specified level of dispensed food product in the container 30, the controller 100 may instruct the outlet 70 to remain operating while the dispenser 10 produces more fresh food product for dispensing.

Compartments

Figure 7:
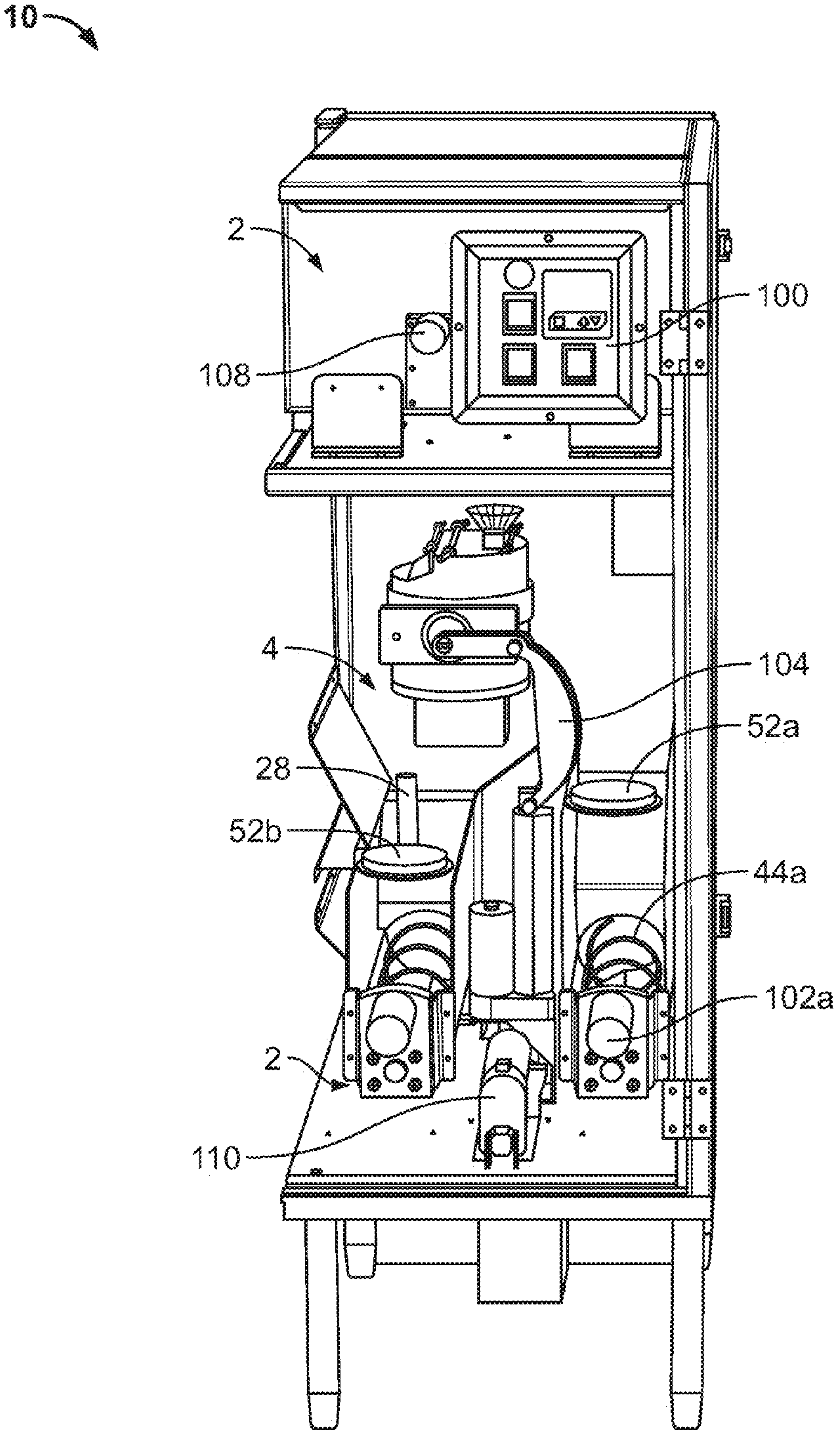
FIG. 7 is a rear view of the dispenser of FIG. 1 with portions of the housing being removed to show some of the internal parts.

The dispenser 10 includes a non-food zone 2 and a food zone 4, as exemplified in FIG. 7. The non-food zone 2 contains the various motors and electronics that operate the one or more compartments and outlet 70. For example, the controller 100 instructs the operations of the one or more compartments' mechanics (e.g., motors and electronics) in response to the detection of events by the various sensors 22, 24, 26, and 28.

Within the food zone 4, the dispenser 10 may contain one or more compartments configured to hold one or more food products. Additionally the one or more compartments may be capable of keeping the one or more food products crisp and/or fresh. In this manner, the dispenser 10 is capable of automatically dispensing a mixture of fresh and/or crispy food products into a single container 30. The one or more compartments are in communication with an outlet 70 configured to dispense food product contained within the one or more compartments to the provided and sensed container 30.

The dispenser 10 may contain at least one, at least two, at least three, or at least four compartments configured to hold one or more food products. Each compartment may hold a single food product or a mixture of two or more food products. In some aspects, a compartment may be configured to produce fresh food product from raw ingredients such as popcorn, fried vegetables or tubers, baked goods such as sweet breads, crackers, customizable dipping sauces, glazes, or spreads. When one or more compartments are configured to produce fresh food product from raw ingredients, the raw ingredients may be contained within the same compartment or may be stored in a separate raw ingredient compartment 80 in a manner so that the raw ingredients may be delivered to the one or more compartments in a sanitary manner.

To maintain a fresh and/or crispy food product, the dispenser 10 may include mechanisms to control the atmosphere inside the one or more compartments. For example, one or more heating elements 52 and temperature sensor may be employed to maintain a constant temperature that may be effective to remove moisture from the compartment and thus help to prevent the food products from becoming soggy or stale. Additionally, each or some of the compartments may include a sensor to monitor the atmospheric moisture content. The one or more heating elements 52 may be any suitable type of heating element that can provide illumination and act has a source of heat to maintain a desired temperature within each of the first food compartment 40 and second food compartment 50. FIGS. 6 and 7 show three heating elements 52*a*, 52*b*, and 52*c*. In one instance, each of the one or more heating elements 52*a*, 52*b*, and 52*c* may be a halogen lamp. Typically, the heating element 52 is configured to maintain the temperature between about 25° C. to about 65° C., which will help to keep the food product fresh and/or crisp. The one or more heating elements 52 (e.g., 52*a*, 52*b*, or 52*c*) may maintain a temperature in the first food compartment 40 or second food compartment 50 at about 25° C., 30° C., 35° C., 40° C., 45° C., 50° C., 55° C., 60° C., or 65° C. The desired temperature is dependent upon the type of food product and the atmospheric moisture content.

The first food compartment 40 and second food compartment 50 may each include other types of heating elements in addition to or in place of the one or more heating elements 52. An air circulation apparatus such as a fan may be provided to assist in providing circulation of warmed air and a more even temperature distribution throughout. Additionally, the first food compartment 40 and second food compartment 50 may each include a temperature sensor in communication with the controller 100. In some instances, the first food compartment 40 and second food compartment 50 may each include an atmospheric moisture sensor in communication with the controller 100.

Different embodiments of the one or more compartments will now be described in more detail.

Turning back to FIG. 5, the dispenser 10 is shown to include a first food compartment 40 and a second food compartment 50. The first food compartment 40 and the second food compartment 50 are configured to store food products until they are dispensed into a consumer provided container 30. As noted above, the food products that are stored in the first food compartment 40 and the second food compartment 50 may include any comestible suitable for human consumption. However, for ease of description and without limiting the types of food products that can be stored and delivered by the dispenser, the following will describe general and specific embodiments, such as the first food compartment 40 as storing a snack food product and the second food compartment 50 as cooking and storing fresh made popcorn.

Figure 8:
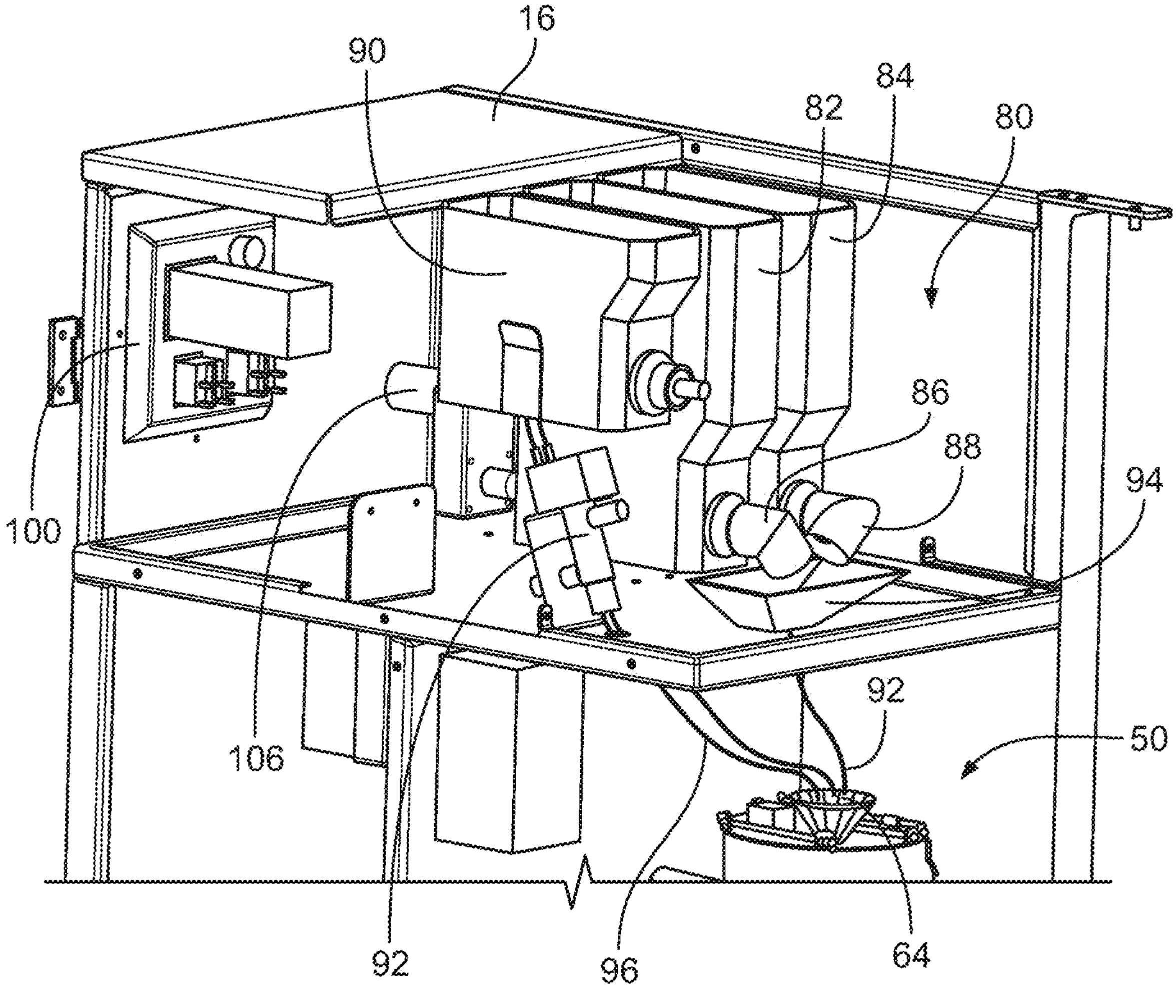
FIG. 8 is a view of a portion of the top of the dispenser of FIG. 1 that shows the raw ingredient compartment and a portion of the second compartment.

The one or more compartments, including a raw ingredient compartment, may be positioned relative to each other to provide a pleasing display or to improve dispensing of the food product. As shown in FIG. 5, the first food compartment 40 and the second food compartment 50 may be positioned side-by-side although it is contemplated that the first food compartment 40 and second food compartment 50 may be oriented in any suitable position with respect to each other. The dispenser 10 may include a raw ingredient compartment 80 in communication with the one or more compartments. In some aspects, the raw ingredient compartment 80 is in communication with the second food compartment 50 and, in some instances is in communication with a popcorn cooking apparatus, such as a kettle 58. As shown in FIGS. 6 and 8, the raw ingredient compartment 80 is positioned vertically above the second food compartment 50, although it is contemplated that the raw ingredient compartment 80 may be located in any suitable location. The one or more compartments may be in communication at a single point of dispensing.

The one or more compartments may each include a food product conveyor 44, a base 46, and a delivery channel 48. The food product conveyor 44 is positioned above the base 46 and is configured to move food product sitting on the base 46 towards the outlet 70. Each base 46 may terminate with a delivery channel 48. The delivery channel 48 catches and guides the moving food product to the outlet 70. As shown in the Figures and the description, a letter such as 'a', 'b', or 'c' may be used to denote a specific element connected with a specific compartment.

In one embodiment, the food product conveyor 44 is provided as a spiral element such as a coiled spring, although other means of moving food product are contemplated such as a push plate. It will be appreciated that when the food product conveyor 44*a* or 44*b* is provided as a coiled spring that rotates in one direction, the food product is moved from the first food compartment 40 or second food compartment 50 to the outlet 70. Additionally, the food product conveyor 44 may be of one type of conveyor in the first food compartment 40 and a different type of conveyor in the second food compartment 50. Alternatively, the food product conveyor 44 may be the same type of conveyor for both compartments. The food product conveyor 44 may be formed of any material suitable for contact with food products and may include a metal, a polymer, or a combination thereof. As shown in FIG. 5, the first food compartment 40 is associated with a food product conveyor 44*a*, base 46*a*, and delivery channel 48*a*, while the second food compartment 50 is associated with a food product conveyor 44*b*, base 46*b*, and delivery channel 48*b*.

Each food product conveyor 44 is connected to its own motor 102. As shown in FIGS. 4 and 7, the food product conveyor 44*a* is coupled to a motor 102*a* and that food product conveyor 44*b* is coupled to a motor 102*b*. Each motor 102*a* and 102*b* may operate independently of the other motor. For example, when the customer inputs a desired ratio of one food product to another, the motor 102*a* of the first food compartment 40 will drive the food product conveyor 44*a* at a set speed to deliver the first food product, and the second motor 102*b* of the second food compartment 50 will drive the food product conveyor 44*b* at a different set speed to generate the desired ratio of dispensed food product. In an illustrative example, if a user inputs a desired ratio of 2:1, motor 102*a* will drive the food product conveyor 44*a* at a faster speed than motor 102*b* drives food product conveyor 44*b* to dispense the desired ratio of 2:1 in the customer's container 30. In one instance, the first motor 102*a* drives the snack conveyor 44*a* twice as fast to deliver two times more food product than the second motor 102*b*. The controller 100 may be pre-programmed to account for size and weight of each food product when calculating the speed of each motor 102*a* and 102*b*.

Additionally, the one or more compartments may include at least one slide 42. The at least one slide 42 may be configured to guide the food product towards the food product conveyor 44 to maintain a somewhat continuous stream of dispensed food product. In an illustrative embodiment, FIGS. 5, 6, 9, and 10 show the dispenser 10 including slide 42*a*, 42*b*, and 42*c*. Slide 42*a* is configured to guide food product towards a food product conveyor 44*a*, while slide 42*b* and slide 42*c* are configured to guide food product towards the other food product conveyor 44*b*. In an effort to keep the food products in the first food compartment 40 and second food compartment 50 moving toward the food product conveyors 44*a* and 44*b*, the slides 42*a*, 42*b*, and 42*c* may, each be independent of the other slides, and be angled between about 30° to about 70° with respect to the base panel 14.

The one or more compartments 40, 50 may be configured to receive a food product from a bulk source. To refill the one or more food compartments 40, 50, the top lid 18 or top panel 16 may be opened to allow input of more food product. Alternatively, the one or more compartments 40, 50 may be moveable such that the respective compartment can be moved away from the dispenser 10. As an example, when seeking to refill the first food compartment 40, the panel 8 or the door assembly 6 may be opened, the first food compartment 40 may be configured to be moved from inside the dispenser 10 to outside of the dispenser 10 to allow input of more food product. Once food product is added, the first food compartment 40 may be moved back into the dispenser 10. The first food compartment 40 may be coupled to the dispenser 10 on at least one rail to help guide it out of and back into the dispenser 10. In some embodiments, the food product conveyor 44*a* remains in place when the first food compartment 40 is moved out of the dispenser 10. Alternatively, the food product conveyor 44*a* and the motor 102*a* may be capable of moving out of the dispenser 10 together.

Figure 10:
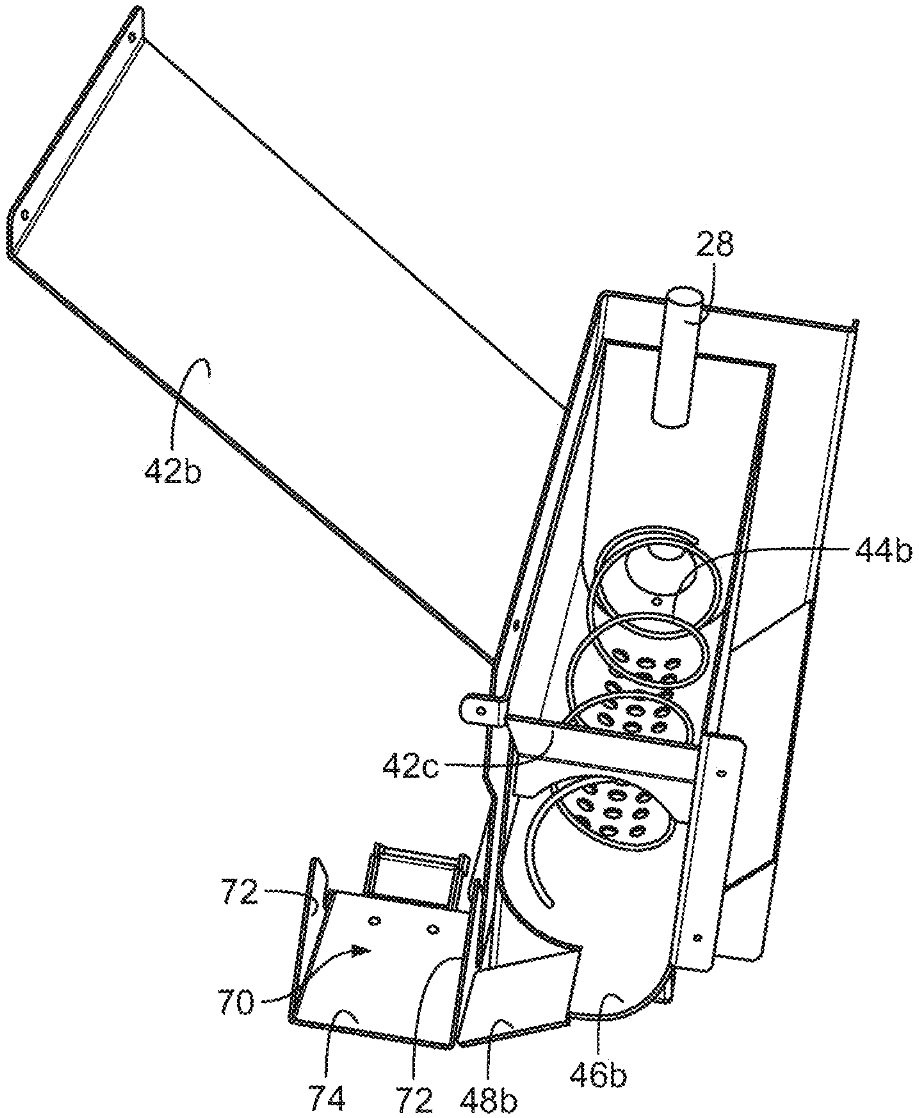
FIG. 10 is a perspective view of the second food compartment in communication with to the outlet.

The base 46 may be configured to have a shape substantially aligned with the shape of the food product conveyor 44. For example, as shown in FIG. 5, the base 46*a* and base 46*b* have a curvature that follows or mimics the shape of the food product conveyor 44*a* and 44*b*, respectively. As illustrated in FIG. 10, the base 46*b* may be perforated to allow food product debris including crumbs, kernels, or broken pieces of popcorn or snack with an average diameter of less than or equal to 12 mm to pass through so that they are not dispensed. Each of the one or more compartments may be configured to slide out of the dispenser 10 for cleaning and to remove debris. In some embodiments, a receptacle (not shown) underneath the base 46*b* is removable to dispose of captured food product debris.

Figure 9:
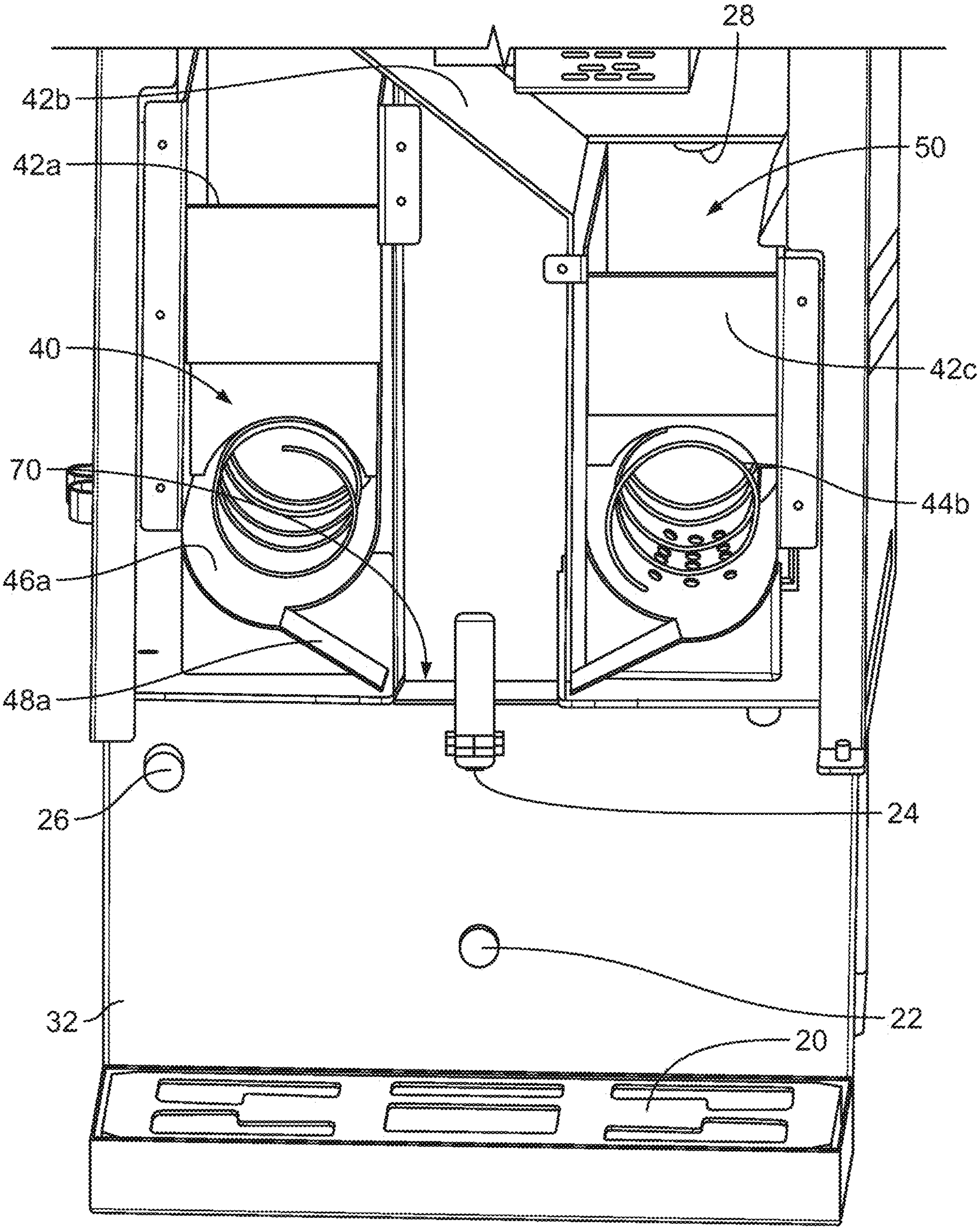
FIG. 9 is a front view of the dispenser of FIG. 1 with the front housing being removed to show the internal portion of the first and second food compartments and the container sensor, product sensor, customer sensor, and quantity sensor.

Each base 46 may include a delivery channel 48 configured to direct the food product to the outlet 70 outlet and, in some instances, the delivery channel 48 may be angled to aid the conveyance of the food product to the outlet 70. In one aspect, the food product travels along the delivery channel 48 by force from the subsequently conveyed food product leaving the food product conveyor 44. As shown in FIGS. 9 and 10, the food product is also conveyed in part by gravity and the angle of the delivery channel 48*a* and 48*b*. The delivery channel 48*a* and 48*b* may each have an angle of about 30°, 35°, 40°, 45°, 50°, 55°, 60°, 65°, or 70° to the base panel 14. In some embodiments, the delivery channel 48*a* and 48*b* surfaces are configured to have minimal friction. The delivery channel 48*a* and 48*b* may be angled in such a way that all food product is cleared through the outlet 70 when the food product conveyor 44*a* and or 44*b* stop moving. In this way, there is a reduced risk of food products mixing before they are dispensed into the container 30. The angle of the delivery channel 48*a* and 48*b* are configured with the movement of the food product conveyor 44*a* and 44*b* in mind to reduce breakage of the food product and to dispense the food product at a speed in which the product sensor 24 can determine the level of fill in the container 30.

In operation, when the container sensor 22 senses the presence of a container 30, the motors 102*a* and 102*b* drive the food product conveyors 44*a* and 44*b* to move food product in one direction along the bases 46*a* and 46*b*, respectively. The food product is delivered to the delivery channels 48*a* and 48*b* where it is dispensed through the outlet 70. Once the product sensor 24 detects a pre-specified level of dispensed food product present in the container 30, the controller 100 instructs the motors 102*a* and 102*b* to stop, which likewise causes the food product conveyors 44*a* and 44*b* to stop moving food from the one or more compartments to the outlet 70. Any food product remaining on the delivery channels 48*a* or 48*b* may slide through the outlet 70.

Outlet

The first food compartment 40 and the second food compartment 50 may be in communication with the outlet 70 best seen in FIGS. 6, 7, and 9. The outlet 70 is coupled to an outlet motor 110 that opens and closes the outlet 70 when a container 30 is sensed and a pre-specified fill level is detected by the sensors 22 and 24. The outlet 70 is configured to funnel food product from the dispenser 10 to the container 30. In one embodiment, an outlet 70 receives food product from delivery channel 48*a* and/or delivery channel 48*b*. It will be appreciated that outlet 70 may be configured to receive food product from each compartment and its associated delivery channel.

Each delivery channel 48 may terminate at the outlet 70. In one embodiment, the outlet 70 is in the form of a hatch 70 having two sidewalls 72 and a base 74. As shown in FIGS. 6 and 10, when the outlet is in the closed position, the base 74 seals each food compartment from the outside environment, and the sidewalls 72 act as a barrier preventing the food product from leaving the delivery channel 48*a* or 48*b*. The sidewalls 72 offer one advantage by preventing food product from the one or more compartments from mixing before dispensing. When the outlet 70 is in the open position, the sidewalls 72 and base 74 act as a chute to guide the food product into the container 30. Alternatively, the outlet 70 could be a gate coupled to a valve that opens in the presence of a container 30. As shown in FIG. 10, the sidewalls 72 of the outlet 70 act as a barrier to prevent food product from leaving the delivery channel 48*b* until the outlet 70 is opened. Once opened, each delivery channel (e.g., 48*a* and 48*b*) provides food product through the outlet where the food products mix in air and in the container 30.

In operation, when a customer places a container 30 within the zone of detection of the dispenser 10, such as on the tray 20, the container 30 is detected by the container sensor 22 and the controller 100 initiates operation of the outlet 70. In one instance, the outlet motor 110 moves the outlet 70 to an open position. Once in an opened position, the one or more food products may be dispensed from the one or more compartments. In one embodiment, the first food product and the second food product may be dispensed simultaneously (i.e., concurrently) or one after the other (i.e., consecutively) into the container 30. In the final steps of operation, once the pre-specified level is detected by the product sensor 24, the controller 100 instructs the outlet motor 110 to close outlet 70.

Specific Compartment Embodiment: Compartment Capable of Making Food Product

The one or more compartments may be configured to make and dispense freshly made food products, such as fresh and crisp popcorn. Referring to FIG. 5, the second food compartment 50 will be described in connection with a popcorn-making device. To that end, the second food compartment includes a kettle 58 and slide 42*b* and 42*c* configured to deliver popcorn from the kettle 58 to the food product conveyor 44*b* and base 46*b*. In some embodiments, the slide 42*b* is configured to separate the second food compartment 50 from the first food compartment 40.

The second food compartment 50 may contain an exhaust system to remove any smoke or fumes generated by the kettle 58. As shown in FIGS. 4 and 5, the second food compartment 50 may include a vent 54 coupled to a blower duct 56 and exhaust 60. The vent 54 may be positioned near the kettle 58. The exhaust 60 may be coupled to the back panel 12, although it is contemplated that the exhaust 60 may be coupled to the side panel 8.

Depending on the type of food product sought to be dispensed, the second food compartment 50 may be in communication with a raw ingredient compartment 80. The raw ingredient compartment 80 may be positioned and configured to deliver one or more raw ingredients to the second food compartment 50, where the raw ingredients may be mixed, cooked, baked, or fried, and ultimately dispensed to the container 30. Where the second food compartment 50 is configured to dispense popcorn, the raw ingredient compartment 80 provides kernels that are popped in the kettle 58; the kettle 58 rotates to dispense popcorn onto the slide 42*b* and 42*c* so that the popcorn travels to the food product conveyor 44*b* and base 46*b* to be conveyed to delivery channel 48*b* and through the outlet 70, as shown in FIG. 5.

Turning back to FIGS. 5 and 6, the second food compartment 50 may include a quantity sensor 28 in communication with the controller 100 and configured to detect the level of food product in the second food compartment 50. In some embodiments, the quantity sensor 28, when the second food compartment 50 is configured to dispense fresh popcorn, detects the level of available popcorn. The quantity sensor 28 is located at a desirable location to detect or "see" the amount of popcorn, for example, by being located above the food product conveyor 44*b*. The quantity sensor 28 may be any type of sensor that can provide an indication of the level or amount of food product present in the second food compartment 50. In some instances, quantity sensor 28 is a proximity sensor. When the quantity sensor 28 detects a level of popcorn below a preselected threshold level in the second food compartment 50, the quantity sensor 28 communicates with the controller 100 to produce more popcorn. In some embodiments, the preselected threshold level is at least about 30%, at least about 35%, at least about 40%, at least about 45%, at least about 50%, at least about 55%, at least about 60%, at least about 65%, at least about 70%, or at least about 75% full of popcorn. In some embodiments, the preselected threshold level is about 75%, about 70%, about 65%, about 60%, about 55%, about 50%, about 45%, about 40%, about 35%, or about 30% full of popcorn. For example, when the quantity sensor 28 detects the level of popcorn is below the preselected threshold level, the controller 100 instructs the raw ingredient compartment 80-coupled mechanics (e.g., motors 106, 108, and valve 92) to deliver ingredients to the kettle 58 and instructs the kettle 58 and its mechanics (i.e., kettle mechanism 104) to begin producing popcorn until the level within the second compartment is about equal to or above the preselected threshold level.

In another embodiment, the dispenser 10 may include a customer sensor 26 that detects the presence of a potential customer. The customer sensor 26 is positioned to detect potential customers within about 1 to about 2 meters of the dispenser 10. In one aspect, unless the popcorn level is at least about 10%, about 15%, about 20%, or about 25% above the preselected threshold level as determined by the quantity sensor 28, the controller 100 instructs the raw ingredient compartment 80-coupled mechanics to deliver at least one raw ingredient to the second compartment 50 to be cooked, baked, fried, or mixed. Where the second compartment 50 includes a popcorn-making kettle 58, the controller 100 instructs the raw ingredient compartment 80 to deliver kernels and oil to the kettle 58. The kettle 58 coupled mechanics then begin producing fresh popcorn. In this manner, the sounds and smells of fresh popcorn can entice a potential customer over to the machine. In one aspect, if the popcorn level is at least about 10%, about 15%, about 20%, or about 25% above the preselected threshold level, then the controller 100 does not instruct the production of fresh popcorn.

Referring to FIGS. 4 and 5, a shaft 62 operatively connects the kettle 58 to a kettle mechanism 104 that is configured to rotate the kettle 58. The kettle mechanism 104 comprises a motor and shafts located in the non-food zone 2 and are configured to rotate the shaft 62 to pour popcorn from the kettle 58 into the food product conveyor 44*b*. The shaft 62 couples to the kettle 58 via a kettle ring 66. The kettle 58 may include an ingredient funnel 64, a kettle top, a kettle flap coupled to the kettle top, and a heating element, which may be any suitable type of heating element capable of producing a sufficient amount of heat to cause the corn to pop. In some embodiments, the heating element may be a 500-watt radiative element.

Referring to FIGS. 5 and 8, the second food compartment 50 may further contain an oil chute 98 and a kernel chute 96 in communication with the raw ingredient compartment 80. The oil chute 98 and the kernel chute 96 may be configured to deliver oil and kernels from the ingredient compartment 80 to the ingredient funnel 64.

The raw ingredient compartment 80 may contain raw ingredients and is in fluid communication with the second food compartment 50. Referring to FIG. 8, within the ingredient compartment 80, kernels are contained in a first material box 82 that is coupled to a first motor 106. Additionally, kernels may also be contained in a second material box 84 that is coupled to a second motor 108. Each of the material boxes 82, 84 includes an opening for receiving kernels and an opening for the kernels to be transported from the first material box 82 and/or the second material box 84 to a delivery funnel 94. The first motor 106 and the second motor 108 may operate by each opening a gate to allow the kernels to fall out of the material boxes 82, 84 into the delivery funnel 94. Alternatively, the first motor 106 and the second motor 108 each drive a plate to push the kernels from the material boxes 82, 84 towards the delivery funnel 94. A first elbow 86 and a second elbow 88 may be coupled to the first material box 82 and the second material box 84, respectively. The first elbow 86 and second elbow 88 are configured to deliver kernels from the material boxes 82, 84 to the delivery funnel 94 and reduce the chance of loose kernels spilling into the ingredient compartment 80. The delivery funnel 94 may be coupled to the ingredient funnel 64 of the kettle 58, as shown in FIGS. 5 and 8. In some embodiments, the kernel chute 96 is in communication with the delivery funnel 94 so that ingredients may be delivered to the ingredient funnel 64.

Referring to FIG. 8, the ingredient compartment 80 may further include an oil canister 90 configured to hold cooking oil. The oil canister 90 may be coupled to a valve 92 by way of a flexible tube 98 that is configured to control the flow of oil from the oil canister 90 to the ingredient funnel 64. The valve 92 may be a solenoid valve, although any type of valve is contemplated. Based on information from the sensors including 28, 22, or 26, the controller 100 may instruct the valve 92 and the motors 106, 108 to operate and deliver kernels and oil to the kettle 58.

Methods

Methods for dispensing one or more food products and producing one or more fresh food products from the dispenser 10 are contemplated. In one aspect, the method includes detecting a container, opening an outlet, conveying one or more food products to the outlet, detecting a prespecified level of dispensed food product, and closing the outlet. The steps of detecting may be performed by one or more sensors in communication with a controller. The controller instructs a set of motors to open the outlet and convey the one or more food products. The container may be of any size and volume. The one or more food products may be dispensed simultaneously or consecutively. In one embodiment, a dispenser is provided to dispense one or more food products. The dispenser includes a food compartment configured to hold one or more food products and a food product conveyor operably coupled to a motor, an outlet, and a controller communicatively coupled to one or more sensors configured to: detect a container, open an outlet, and engage the motor operably coupled to the food product conveyor to dispense one or more food products to the container. The pre-specified fill level may be at least about 75%, at least about 80%, at least about 85%, at least about 90%, at least about 95%, or at least about 99%. Once the pre-specified level is detected, the controller is configured to disengage the motor operably coupled to the food product conveyor to cease dispensing the one or more food products. Additionally, the controller instructs to close the outlet.

In another aspect, a method is disclosed for producing fresh food product in the dispenser 10. The method may include detecting an amount of available of food product in a food compartment and instructing the production of fresh food product when the amount is below a preselected threshold level. In another aspect, the method may include detecting a container or a potential customer, delivering raw ingredients to a food compartment configured to cook, mix, bake, or fry the raw ingredients, and delivering the fresh food product to a food product conveyor. In some aspects, the method further includes conveying the food product to an outlet, and detecting a pre-specified level of dispensed food product to the container. Where the method includes detecting a potential customer, detection occurs when a potential customer is detected within about 2 meters of the dispenser.

Detection may be performed by one or more sensors. When a potential customer is detected by one or more sensors, a controller in communication with the one or more sensors instructs the delivery of raw ingredients to the food compartment. In some aspects, a quantity sensor detects the amount of available food product within the food compartment. When the available amount is below a preselected threshold level, the controller instructs the delivery of raw ingredients and production of fresh food product. When the amount is above a set threshold level, the controller does not instruct the delivery of raw ingredients or the production of fresh food product. In another aspect, the controller may instruct to produce fresh food product when a potential customer is detected and the amount of food product is detected at a certain amount that may be different from the preselected threshold level. The steps of this method may be performed by a dispenser as described above.

The method of producing more food product may include providing raw ingredients to a food compartment configured to produce a fresh food product based on the type of ingredient provided. The raw ingredients may be contained in the food compartment or may be contained in a separate raw ingredient compartment in fluid communication with the food compartment. Where the raw ingredients are in a separate raw ingredient compartment, the method may include the step of delivering at least one raw ingredient to the food compartment configured to produce fresh food product.

A method is provided that includes detecting a container, opening an outlet, conveying one or more food products into the container, detecting a pre-specified fill level of food product in the container, and closing the outlet. In another aspect, a container may be present but the amount of available food product is below a certain preselected threshold level. In one aspect, a controller communicatively coupled to a sensor detects the amount of available food product and instructs production of more food product if the amount detected is below a certain preselected threshold level. Once the sensor detects an amount at or greater than the threshold level, the outlet is opened and the motor is engaged to dispense the freshly made food product into the container. Once a pre-specified level of dispensed food product is detected, the outlet is closed and the motor is disengaged. The outlet may close before the motor disengages. Alternatively, the outlet may close after the motor disengages.

A method is provided for enticing a potential customer to a dispenser including detecting a potential customer within about 1 to about 2 meters of the dispenser, detecting the amount of available food product, and, if the amount is at or below a preselected threshold level, producing more fresh food product to entice the customer with sounds and smells of the freshly made food product. If the customer places a container with the zone of detection of the dispenser, then the method further includes opening the outlet and dispensing the food product, and ceasing dispensing when a pre-specified level is detected.

A method of dispensing a food product includes detecting a container within a zone of detection, opening an outlet, driving a food product conveyor to move one or more food product towards an outlet, detecting a pre-specified level of dispensed food product in the container, stopping the food product conveyor, and closing the outlet. The method may further include analyzing signals from four sensors. The four sensors include a container sensor that detects the presence of a container, a product sensor that detects the level of dispensed food product, a quantity sensor that detects the amount of available food product, and a customer sensor that detects the presence of a potential customer. To perform the step of analyzing, a controller may be in communication with the four sensors and has a hierarchy of instructions based on the information provided to the controller by the four sensors.

The information and instructions may be as follows. First, when the container sensor detects a container and the quantity sensor detects a sufficient level of available food product, then the controller instructs opening the outlet and conveying one or more food products. The method may include detecting a container, detecting a sufficient level of available food product, opening an outlet, and conveying one or more food products to the container.

However, when the container sensor detects a container and the quantity sensor detects an insufficient level of available food product, then the controller may instruct the delivery raw ingredients to generate fresh food product. The method may include detecting a container, detecting an insufficient amount of available food product, delivering raw ingredients to a compartment configured to generate fresh food product.

Alternatively, the controller may instruct to open the outlet, convey the available food product, and deliver raw ingredients to generate fresh food product. The method may include detecting a container, detecting an insufficient amount of available food product, opening an outlet, conveying available food product to the container, delivering at least one raw ingredient to a compartment configured to generate fresh food product, and conveying fresh food product the container. The outlet may remain open during this process or may temporarily close when the available food product amount is about 75% below the preselected threshold level max or lower. In one aspect, when the container sensor detects a container, but the product sensor does not detect a pre-specified level of dispensed food product and the quantity sensor detects an amount below a preselected threshold level, then the controller may instruct the delivery of raw ingredients to produce more fresh food product. The outlet may remain open while more food product is generated. Once the quantity sensor detects a preselected threshold level of available food product, the one or more food products is conveyed to the container. The method may include detecting a container, conveying food product, not detecting the pre-specified level of dispend food product, detecting an amount of available food product below a preselected threshold level, ceasing to convey food product, delivering at least one raw ingredient to a compartment configured to generate fresh food product, detecting an amount of available food product at or above a preselected threshold level, conveying the fresh food product to the container, and ceasing conveying once a pre-specified fill level of dispensed food product is detected.

Second, when the container sensor detects a container and the product sensor detects a pre-specified level of dispensed product, then the controller may instruct to cease conveying and close the outlet. The method includes detecting a container, opening an outlet, conveying a food product to the container, detecting a pre-specified level of dispensed food product, ceasing conveying food product, and closing the outlet.

Third, when no container is detected, the quantity sensor may detect an amount of available food product below a preselected threshold level, then the controller may instruct the production of fresh food product until the quantity sensor detects an amount at or above a preselected threshold level. The method may include detecting an amount of available food product below a preselected threshold, delivering raw ingredients to a compartment configured to generate fresh food product, generating fresh food product, and ceasing the generation of fresh food product upon the detection of an amount of available food product at or above a preselected threshold level. The amount below a preselected threshold level may be at least about 1%, 2%, 3%, 4%, 5%, 10%, 15%, 20%, 25%, or about 30% below the preselected threshold level. The preselected threshold level may be about 30%, 35%, 40%, 45%, 50%, 55%, 60%, 65%, 70%, 75%, 80%, 85%, 90%, 95%, or about 99% filled of the available volume in the compartment.

Fourth, when the customer sensor detects a potential customer, the container sensor does not detect a container, and the quantity sensor detects an amount of available food product within an acceptable range of the preselected threshold level, the controller may instruct delivery of raw ingredients to produce fresh food product to entice the potential customer over to the dispenser. When the quantity sensor detects an amount of food product outside of an acceptable range of the preselected threshold level, the controller does not instruct the delivery of raw ingredients to produce fresh food product. The method may include detecting a potential customer, detecting an amount of available food product within an acceptable range of the preselected threshold level, delivering raw ingredients to a compartment configured to generate fresh food product, and generating fresh food product to entice a customer over. Alternatively, the method may include detecting a potential customer, detecting an amount of available food product outside of an acceptable range of the preselected threshold level, ceasing any further action until a container is detected.

When a potential customer becomes an actual customer, the method further includes detecting a container, detecting the amount of available food product, opening an outlet, conveying food product, detecting pre-specified fill level of dispensed food product in the container, ceasing conveying of the food product, and closing the outlet.

In an alternative embodiment, the dispenser 10 may include an external lever operably connected to the outlet 70 so that when the lever is in a first position, the outlet 70 is open, and when the lever is a second position, the outlet 70 is closed. When the lever is moved to the first position to open the outlet 70, the controller 100 receives a signal to begin dispensing food product from the compartments. Then, when the lever is moved to the second position, the controller 100 receives a signal to terminate dispensing.

It will be understood that the invention has been described above purely by way of example, and modifications of detail can be made within the scope of the invention.

Each feature disclosed in the description, and (where appropriate) the claims and drawings may be provided independently or in any appropriate combination.

Reference numerals appearing the claim are by way of illustration only and shall have no limiting effect on the scope of the claims.

While the concepts of the present disclosure are susceptible to various modifications and alternative forms, specific exemplary embodiments of the disclosure have been shown by way of example in the drawings. It should be understood, however, that there is no intent to limit the concepts of the present disclosure to the particular disclosed forms; the intention is to cover all modifications, equivalents, and alternatives falling within the spirit and scope of the invention as defined by the claims.

In general, a product dispenser is described. The product dispenser has at least a first compartment and a second compartment, an outlet configured to dispense food product from the first compartment, the second compartment, or both when a container is detected to be within a preselected distance from the dispenser; and a product sensor configured to detect a pre-specified level of food product present in the container and, upon detection of the pre-specified level, terminate dispensing.

Aspects of the invention are also set out in the following set of numbered clauses, in which is described:

1. A product dispenser comprising:
   - at least a first compartment and a second compartment;
   - an outlet configured to dispense food product from the first compartment, the second compartment, or both when a container is detected to be within a preselected distance from the dispenser; and
   - a product sensor configured to detect a pre-specified level of food product present in the container and, upon detection of the pre-specified level, terminate dispensing.

2. The dispenser of clause 1, further comprising a movable outlet such that the movable outlet, in one position, is open to permit food product to pass to the container from the first compartment, the second compartment, or both the first compartment and the second compartment.

3. The dispenser of clause 2 wherein the movable outlet, in a second position, is closed to prevent food product from passing from the first compartment, the second compartment, or both the first compartment and the second compartment.

4. The dispenser of clause 2 or 3 further comprising a container sensor configured to sense the presence of the container and, when the presence of the container is sensed, to send a signal to move the outlet to an open position.

5. The dispenser of any preceding clause, wherein the first compartment, the second compartment, or both each include a food product conveyor that moves food from the compartment to the outlet when a container is detected to be within a preselected distance from the dispenser.

6. The dispenser of any preceding clause wherein the first compartment, second compartment, or both each include a base substantially aligned with the food product conveyor.

7. The dispenser of clause 6 wherein the base terminates at a delivery channel that communicates with the outlet.

8. The dispenser of any of the preceding clauses further comprising a heating element configured to maintain a temperature within the first compartment, the second compartment, or both the first and second compartment between about 25° C. to about 65° C.

9. The dispenser of any of the preceding clauses further comprising a customer sensor configured to detect the presence of a potential customer.

10. The dispenser of any of the preceding clauses further comprising a raw ingredient compartment having at least one outlet in communication with the second compartment.

11. The dispenser of clause 10, wherein the detection of the container sends a signal to the raw ingredient compartment to release at least one raw ingredient into the second compartment.

12. The dispenser of clause 11, wherein the second compartment is configured to mix, cook, bake, or fry the at least one raw ingredient.

13. The dispenser of any preceding clause, further comprising a quantity sensor configured to detect the amount of food product present in the second compartment.

14. The dispenser of clause 13, wherein the quantity sensor sends a signal to initiate the mixing, cooking, baking or frying of the at least one raw ingredient when the quantity sensor detects a level of food product present in the second compartment that is below a preselected threshold level of at least about 30% of a maximum.

15. The dispenser of clause 9, wherein, when the customer sensor detects the presence of a potential customer, a signal is generated to release at least one raw ingredient into the second compartment and to initiate the mixing, cooking, baking or frying of the at least one raw ingredient to make more food product to entice the potential customer if the level of food product is not more than 10% above the maximum preselected threshold level.

16. The dispenser of any of the preceding clauses, wherein the preselected level of dispensed food product is at least about 75% of a volume of the container.

17. The dispenser of any of the preceding clauses, wherein the first compartment, second compartment, or both are configured to move out of and into the dispenser.

18. The dispenser of any of the preceding clauses, wherein the food product is selected from a cracker, cheese puff, cookie, chip, or popcorn.

19. The dispenser of clause 11, 12, 13, 14, or 15, wherein the raw ingredient is selected from kernels, vegetable, tuber, pulse, wheat-based flour, corn-based flour, sugar, water, salt, or oil.

The invention claimed is:

1. A product dispenser comprising:

at least a first compartment and a second compartment;

a first delivery channel in communication with the first compartment and a moveable outlet;

a second delivery channel in communication with the second compartment and the moveable outlet; and, wherein the movable outlet includes two sidewalls and a base, the two sidewalls forming a barrier between the first delivery channel and second delivery channel when the movable outlet is in a closed position and the base seals each compartment when the movable outlet is in the closed position and the movable outlet is configured to dispense the food product from the first compartment, the second compartment, or both when the moveable outlet is in an open position.

2. The dispenser of claim 1, wherein at least one of the first compartment or the second compartment include a food product conveyor that moves food from the respective compartment to the movable outlet when a container is detected to be within a preselected distance from the dispenser.

3. The dispenser of claim 1 further comprising a raw ingredient compartment having at least one outlet in communication with at least one of the first or the second compartment.

4. The dispenser of claim 1 further comprising a quantity sensor configured to detect the amount of food product present in at least one of the first or the second compartment.

5. The dispenser of claim 1 further comprising a container sensor configured to sense the presence of the container and, when the presence of the container is sensed, to send a signal to move the outlet to the open position.

6. The dispenser of claim 5 further comprising a product sensor configured to detect a pre-specified level of food product present in the container and, upon detection of the pre-specified level, terminate dispensing.

7. The dispenser of claim 6, wherein the pre-specified level of dispensed food product is at least about 75% of a volume of the container.

8. The dispenser of claim 6 wherein the product dispenser detects a volume of the container and calculates an amount of food product to dispense prior to dispensing the food product.

9. The dispenser of claim 1 further comprising a customer sensor configured to detect the presence of a potential customer.

10. The dispenser of claim 9, wherein, when the customer sensor detects the presence of a potential customer, a signal is generated to release at least one raw ingredient into at least one of the first or the second compartment and to initiate the mixing, cooking, baking or frying of the at least one raw ingredient to make more food product if the level of food product is not more than 10% above the maximum preselected threshold level.

11. The dispenser of claim 9, wherein the detection of the container sends a signal to the raw ingredient compartment to release at least one raw ingredient into at least one of the first or the second compartment.

12. The dispenser of claim 11, wherein the at least one of the first or the second compartment is configured to mix, cook, bake, or fry the at least one raw ingredient.

13. The dispenser of claim 12, wherein the quantity sensor sends a signal to initiate the mixing, cooking, baking or frying of the at least one raw ingredient when the quantity sensor detects a level of food product present in at least one of the first or the second compartment that is below a preselected threshold level of at least about 30% of a maximum.

14. A product dispenser comprising:

at least a first compartment and a second compartment;

a first delivery channel in communication with the first compartment and a moveable outlet;

a second delivery channel in communication with the second compartment and the moveable outlet, wherein the movable outlet includes two sidewalls and a base, the two sidewalls forming a barrier between the first delivery channel and second delivery channel when the movable outlet is in a closed position and the base seals each compartment when the movable outlet is in the closed position and the movable outlet is configured to dispense the food product from the first compartment, the second compartment, or both when the moveable outlet is in an open position;

a container sensor configured to sense the presence of the container and, when the presence of the container is sensed, to send a signal to move the outlet to the open position; and a product sensor configured to detect a pre-specified level of food product present in the container and, upon detection of the pre-specified level, terminate dispensing, wherein the pre-specified level of dispensed food product is at least about 75% of a volume of the container.

15. The dispenser of claim 14, wherein at least one of the first compartment or the second compartment include a food product conveyor that moves food from the respective compartment to the movable outlet when a container is detected to be within a preselected distance from the dispenser.

16. The dispenser of claim 14 further comprising a customer sensor configured to detect the presence of a potential customer.

17. The dispenser of claim 14 further comprising a quantity sensor configured to detect the amount of food product present in at least one of the first or the second compartment.

18. The dispenser of claim 14 further comprising a raw ingredient compartment having at least one outlet in communication with at least one of the first or the second compartment.

19. The dispenser of claim 18, wherein the detection of the container sends a signal to the raw ingredient compartment to release at least one raw ingredient into at least one of the first or the second compartment.

20. The dispenser of claim 19, wherein the at least one of the first or the second compartment is configured to mix, cook, bake, or fry the at least one raw ingredient.

* * * * *